S. M. HALEY.
FOOT STEERING DEVICE FOR AUTOMOBILES.
APPLICATION FILED FEB. 26, 1917.
1,257,601.
Patented Feb. 26, 1918.
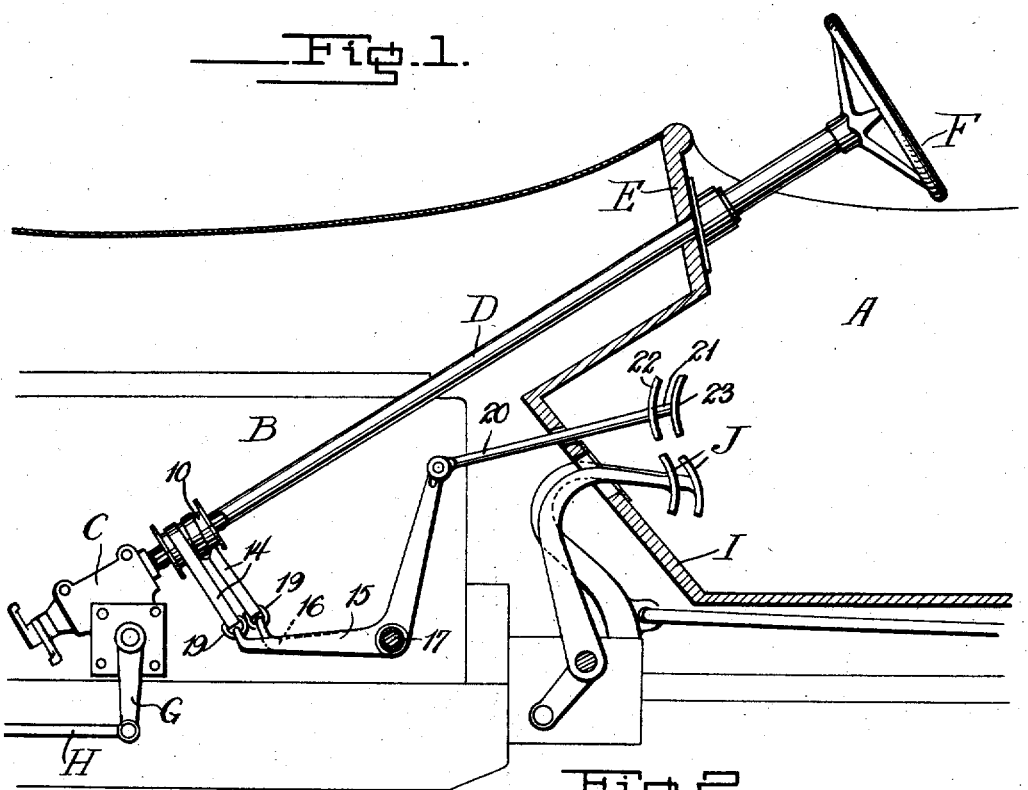
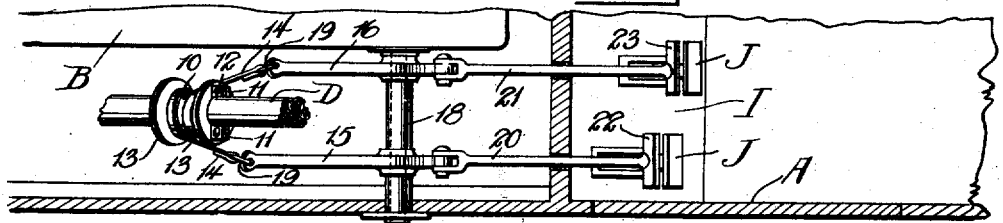
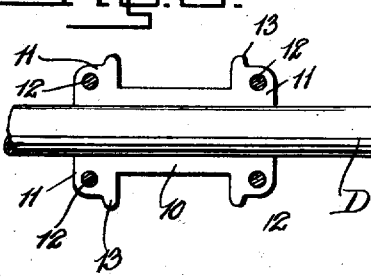 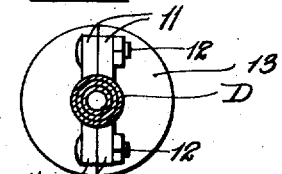
Inventor
S. M. Haley

UNITED STATES PATENT OFFICE.

SEABRON M. HALEY, OF DALLAS, TEXAS.

FOOT STEERING DEVICE FOR AUTOMOBILES.

1,257,601. Specification of Letters Patent. Patented Feb. 26, 1918.

Application filed February 26, 1917. Serial No. 151,107.

*To all whom it may concern:*

Be it known that I, SEABRON M. HALEY, a citizen of the United States, and a resident of Dallas, in the county of Dallas and State of Texas, have invented a certain new and useful Improvement in Foot Steering Devices for Automobiles, of which the following is a specification.

The present invention relates to steering or guiding means for automobiles, air-craft, water-craft, and the like.

An object of the present invention is to provide an attachment to the ordinary steering devices which are operated by hand-wheels, for controlling the steering mechanism by foot, or other parts of the body to relieve the hand for a sufficient length of time to relax the same, or for performing various other functions, such as shifting gears, adjusting clothing and the like.

The invention has for another object to provide an attachment for steering mechanism which may be applied to devices already in use, and which is of simple construction and few parts readily assembled upon automobiles and the like without interference with the adjacent operative parts of the vehicle.

It is the further aim of the present invention to provide a steering device with pedals so connected thereto and so located that the same may be readily reached with the feet, and the latter may be readily shifted from the pedals to the usual brake and clutch pedals without any appreciable delay.

The above, and various other objects and advantages of this invention will be in part described, and in part understood, from the following detailed description of the present preferred embodiment, the same being illustrated in the accompanying drawing wherein:

Figure 1 is a fragmentary longitudinal section taken through a motor vehicle having a foot steering device constructed according to the present invention applied thereto.

Fig. 2 is a detail top plan view of the improved steering device, the adjacent parts of the automobile being shown in section.

Fig. 3 is a longitudinal sectional view through the two-part drum of this invention as applied to the steering gear post.

Fig. 4 is a transverse section through the steering gear post looking toward one end of said drum.

Referring to this drawing, wherein like parts are designated by similar characters of reference throughout the several views, the vehicle or craft to which the steering device is applied is shown in the form of a motor vehicle having a body part A with an engine B mounted therein in the usual manner. The body A carries the usual steering gear, designated as C, from which projects the usual steering gear post D inclining upwardly and passing through the dash or instrument board E. The upper end of the steering gear post D terminates in the usual steering wheel F adapted to be turned by hand for operating the steering gear C and swinging the steering arm G to move the steering rod H.

The foot-board I of the motor vehicle is provided in the usual manner with the brake and clutch pedals J of usual construction.

The attachment of this invention comprises a two-part or split drum 10, each section of which is of semicylindrical form and provided at its opposite ends with substantially diametrically opposed lugs 11 adapted to receive clamping bolts 12 therethrough for securing the drum sections about the lower end of the steering gear post D. The drum 10 is provided at opposite ends with annular flanges or heads 13, and has a relatively smooth peripheral portion lying between the flanges.

The drum 10 is provided with a flexible turning member 14, the same being disclosed in the present instance as in the form of a single length strap or band wound one or more times about and secured to the drum 10 and having its opposite extremities projecting downwardly from the opposite sides of the drum 10.

Bell-crank levers 15 and 16 are arranged at one side of the engine B, and are pivotally mounted at their angled portions upon a pin or bolt 17, secured at one end to the engine B, and at its opposite end to the adjacent side bar to the body A of the vehicle. The bell-crank levers 15 and 16 are preferably spaced apart upon the pivot pin 17 by means of a spacing sleeve 18 arranged between the levers and upon the pin 17. The pivoted portions of the levers 15 and 16 are preferably provided with hub portions or bosses upon their opposite sides to steady the bell-crank levers and afford a substantial bearing surface for the same.

The bell-crank levers 15 and 16 are preferably arranged with one arm extending horizontally forward, and their opposite arms extending at substantially one-hundred degrees from the horizontal arm upwardly and backwardly. The forward arms of the bell-crank levers are connected, by open links 19 or the like, with the respective free ends of the strap 14. The upper ends of the bell-crank levers 15 and 16 are pivotally connected to push rods 20 and 21 which have slidable bearing through the foot-board I above the pedals J. The push-rods 20 and 21 are in the form of pedals having foot-pieces 22 and 23 formed upon their upper inner ends adapted to be engaged by the feet for pushing the rods 20 and 21 and operating the bell-crank levers.

The detachable drum 10 may be secured upon the steering gear post D of any type of steering gear, and is preferably located near the lower end of the post. The pivot pin 17 for the bell-crank levers may be mounted in any other suitable manner than that above described which is found convenient in the construction of motor vehicles to which the attachment is applied.

When the attachment is in place, and the operator desires to release his hold upon the steering wheel F, it is only necessary for the operator to place his feet upon the pedals 22 and 23 and to manipulate the same for rocking the bell-crank levers 15 and 16 and winding the strap 14 in opposite directions about the drum 10 to maintain the steering gear post D in the desired adjusted position. It will be readily understood that by depressing the foot pedal 22 the bell-crank lever 15 is rocked to lower its forwardly extending end and draw the adjacent end of the strap 14 over the drum 10. This rotates the steering gear post D in one direction. When the opposite foot lever 23 is depressed, the opposite bell-crank lever 15 is moved downwardly at its forward end, and the strap 14 is unwound in an opposite direction over the drum 10, rotating the steering gear post D in an opposite direction. The strap 14 forms a connection between the foot pedals 22 and 23 to move the same in opposite directions past one another, and thus moves one forward while the opposite one is depressed.

It is of course understood that various changes and modifications may be made in the details of construction of the above-specifically described steering device without departing from the spirit of this invention, the changes and modifications being restricted only by the scope of the following claims.

I claim:—

1. In a steering device, the combination of a steering gear post, right and left pedals arranged at the opposite sides of the steering post, and opposed connections between the post and the pedals for moving the latter in opposite directions.

2. In a steering device, the combination of a steering gear post, right and left foot pedals, and opposite connections between said pedals and said steering gear post for turning the same in opposite directions, by the feet.

3. In a steering device, the combination of a steering gear post, right and left levers, and opposite connections between said levers and said steering gear post for turning the latter in opposite directions upon the reverse operations of said levers, said connections being arranged to move the pedals in opposite directions upon the turning of the post.

4. In a steering device, the combination of a steering gear post, a drum mounted on said post, a flexible connector wound about said drum, and a pair of foot levers connected to the free ends of said flexible connector and adapted to be operated in opposite directions for turning said steering gear post in opposite directions.

5. The combination with a steering device including a steering post, of a drum detachably mounted on said steering post, a flexible connector wound about said drum, a pair of levers connected at one end to the opposite extremities of said connector, and a pair of foot levers connected to the opposite extremities of said levers.

6. In a steering device, the combination of a steering gear post, a two-part detachable drum mounted on said steering gear post, a flexible connector wound about said drum, a pair of bell-crank levers pivotally mounted adjacent to said drum and having one end thereof connected to the free extremities of said connector, and a pedal connected to the opposite end of each bell-crank lever.

7. The combination with a motor vehicle provided with a steering device including a steering post, and the usual brake and clutch pedals, of a drum detachably mounted on said steering gear post, a flexible connector wound about said drum, a pair of bell-crank levers pivoted in the body of the motor vehicle and having their forward ends connected to said connector, and a pair of pedals mounted in the motor vehicle above said brake and clutch pedals and having connection with the opposite ends of said bell-crank levers to rock the same in opposite directions and actuate said steering gear post.

8. In a steering device, the combination of a steering gear post, a drum detachably secured to said post and comprising a pair of substantially cylindrical sections, means for binding said sections together about said post, a flexible connector wound about said drum, a pair of pivoted levers having connection at one end to the opposite extremities of said connector, and pedals connected to the opposite ends of said levers for rocking the same.

SEABRON M. HALEY.

Copies of this patent may be obtained for five cents each, by addressing the "Commissioner of Patents, Washington, D. C."